(12) United States Patent
Choi et al.

(10) Patent No.: US 7,933,352 B2
(45) Date of Patent: Apr. 26, 2011

(54) CROSS QAM MODULATION-BASED SYMBOL MAPPING METHOD AND APPARATUS IN A MOBILE COMMUNICATION SYSTEM

(75) Inventors: Jongsoo Choi, Suwon-si (KR); Yan Xin, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 633 days.

(21) Appl. No.: 12/045,400

(22) Filed: Mar. 10, 2008

(65) Prior Publication Data

US 2008/0219387 A1 Sep. 11, 2008

(30) Foreign Application Priority Data

Mar. 8, 2007 (KR) .................. 10-2007-0023246
Jul. 26, 2007 (KR) .................. 10-2007-0075195

(51) Int. Cl.
*H04L 5/12* (2006.01)
*H04L 27/36* (2006.01)

(52) U.S. Cl. ....................... 375/261; 375/298

(58) Field of Classification Search .................. 375/261, 375/298, 346
See application file for complete search history.

(56) References Cited

U.S. PATENT DOCUMENTS

| 6,118,479 A | 9/2000 | Maeda et al. |
| 2002/0122465 A1 | 9/2002 | Agee et al. |
| 2008/0037412 A1* | 2/2008 | Geile et al. .................. 370/208 |
| 2009/0092040 A1* | 4/2009 | Dapper et al. ................ 370/208 |

* cited by examiner

*Primary Examiner* — Don N Vo
(74) *Attorney, Agent, or Firm* — The Farrell Law Firm, P.C.

(57) ABSTRACT

A method for determining a bit pattern of a symbol in a wireless communication system using a cross modulation scheme. The method includes generating symbols with the cross modulation scheme, classifying positions of coding symbols by reliabilities of at least 3 classes according to an average bit error rate BER(ave) of symbols generated with the cross modulation scheme and a bit error rate BER based on transmission positions of the coding symbols in a modulation symbol during transmission of a packet with the cross modulation scheme, and determining a bit pattern such that higher-priority symbols are inserted into higher-reliability positions.

19 Claims, 13 Drawing Sheets

CROSS QAM MODULATION-BASED SYMBOL MAPPING METHOD AND APPARATUS IN A MOBILE COMMUNICATION SYSTEM

PRIORITY

This application claims priority under 35 U.S.C. §119(a) to a Korean Patent Application filed in the Korean Intellectual Property Office on Mar. 8, 2007 and assigned Serial No. 2007-23246, and a Korean Patent Application filed in the Korean Intellectual Property Office on Jul. 26, 2007 and assigned Serial No. 2007-75195, the disclosures of which are incorporated herein by reference.

BACKGROUND OF THE INVENTION

1. Field of the Invention

The present invention relates generally to a symbol mapping method and apparatus in a mobile communication system, and in particular, to a symbol mapping method and apparatus for a Bit Error Rate (BER)-based M-ary Quadrature Amplitude Modulation (M-QAM) modulation scheme having a cross constellation in a GSM/EDGE Radio Access Network (GERAN) Evolution mobile communication system.

2. Description of the Related Art

Recently, the 3GPP ($3^{rd}$ Generation Partnership Project) TSG-GERAN (GSM/EDGE Radio Access Network) standard conference is proceeding with GERAN Evolution for performance improvement of data transmission rate, spectral efficiency, etc., and is scheduled to adopt the high-order QAM modulation of 16-QAM and 32-QAM as new modulation schemes for improving downlink and uplink performances.

In the GERAN system, different coding schemes can be used based on the Modulation and Coding Scheme (MCS). The modulation schemes used in the GERAN system include Gaussian Minimum Shift Keying (GMSK) and 8-ary Phase Shift Keying (8-PSK). GMSK, a scheme for limiting a bandwidth by passing binary data through a Gaussian Low Pass Filter (LPF) and then performing frequency modulation thereon in a predetermined shift ratio, has a high spectral concentration and high out-band spectral suppression by allowing the data to continuously shift between two frequencies. 8-PSK, a scheme for modulating data such that the data is associated with a phase-shifted code of a carrier, can increase frequency efficiency. As coding schemes used in the GERAN system, there are nine techniques defined for Packet Data Traffic Channels (PDTCHs). The nine techniques include nine schemes of Modulation and Coding Schemes (MCSs) of MCS-1 through MCS-9 for EDGE/EGPRS (Enhanced General Packet Radio Service). In actual communication, a selected one of the various combinations of the modulation schemes and the coding techniques is used. The combinations are identified as MCSs.

FIG. 1 is a diagram illustrating a structure of a downlink transmitter in the GERAN system. Referring to FIG. 1, one Radio Link Control (RLC) packet data block (RLC block) is transferred to a channel encoder 110 where it is coded by a convolutional code, and then provided to an interleaver 120 after undergoing puncturing according to a predetermined puncturing pattern. The data output from the interleaver 120 is transferred to a multiplexer 130 for allocating data on a physical channel. Also, RLC/Medium Access Control (MAC) header information, Uplink State Flag (USF), and code identifier bits are input to the multiplexer 130. The multiplexer 130 partitions the collected data into 4 normal bursts, and allocates each burst to a time slot of a Time Division Multiple Access (TDMA) frame. Data of each burst is modulated by modulator 140 and then input to a training sequence symbol rotator 150. The training sequence symbol rotator 150 adds the Training Sequence Code (TSC) to the modulated data, performs phase rotation on the TSC, and outputs the result to a transmitter 160. For ease of description, a detailed description of an apparatus, for example, a Digital-to-Analog (D/A) converter, additionally needed to transmit the modulated signal will be omitted herein.

FIG. 2 is a diagram illustrating a structure of a receiver in a GERAN system. Referring to FIG. 2, a radio front-end unit 210 receives bursts transmitted in units of time slots via a receive antenna. The received data is input to a buffering and phase derotation unit 220 where it undergoes buffering and phase derotation. The data output from the buffering and phase derotation unit 220 is input to a modulation detection and channel estimation unit 230 that detects a modulation scheme of the received signal and estimates a channel. A training sequence phase derotator 240 detects a degree of phase rotation of the training symbol to detect the modulation scheme, and phase-derotates the training sequence. The data is transferred to a deinterleaver 260 after undergoing equalization and demodulation in an equalizer 250 based on the detected modulation scheme and channel-estimated information. The deinterleaved data is transferred to a channel decoder 270 where the transmitted data is restored.

The foregoing GERAN Evolution system is scheduled to introduce the turbo encoder adopted in 3G Wideband Code Division Multiple Access (WCDMA) as a channel encoder, and to introduce 16-QAM and 32-QAM modulation schemes as a high-order modulation technology. The modulation order is equal to 32/128/ . . . /M-QAM ($M=2^{m+1}$), which can be expressed with a cross constellation. Determining a cross constellation's size is equivalent to determining a modulation scheme. Accordingly, the GERAN Evolution system can select various modulation schemes according to the channel quality. More specifically, square M-QAM ($M=2^{m+1}$) can increase the number m of bits per symbol, which is a factor for extending the constellation size, only from m to m+2, for example, like 16/64/256-QAM, but cross M-QAM can increase the number m of bits per symbol even from m to m+1, for example, like 32-QAM or 128-QAM.

Consequently, when the GERAN Evolution system uses a cross modulation scheme such as 32-QAM, there is a need for a method and apparatus for efficiently mapping symbols to bursts in order to improve performance and reliability.

SUMMARY OF THE INVENTION

An aspect of the present invention is to address at least the problems and/or disadvantages and to provide at least the advantages described below. Accordingly, an aspect of the present invention is to provide a symbol mapping method and apparatus for seeking performance improvement in a GERAN Evolution wireless communication system to which a cross M-QAM modulation scheme is applied.

Another aspect of the present invention is to provide a method and apparatus for allocating priority data of a reliability corresponding to the reliability of bits of cross M-QAM symbols during burst mapping, before transmission, thereby maximizing turbo coding gain.

According to one aspect of the present invention, there is provided a method for determining a bit pattern of a symbol in a wireless communication system using a cross modulation scheme. The method includes generating symbols with the cross modulation scheme; classifying positions of coding symbols by reliabilities of at least 3 classes according to an average bit error rate BER(ave) of symbols generated with the cross modulation scheme and a bit error rate BER based on transmission positions of the coding symbols in a modulation symbol during transmission of a packet with the cross modulation scheme; and determining a bit pattern such that higher-priority symbols are inserted into higher-reliability positions.

According to another aspect of the present invention, there is provided an apparatus for determining a bit pattern of a symbol in a transmitter of a wireless communication system using a cross modulation scheme. The apparatus includes a mapper for partitioning coded user data and control information into data having a transmittable size within in a frame, partitioning data mapped to each frame in units of sub-blocks, and mapping the partitioned data; and a cross modulator for modulating the sub-block based data with the cross modulation scheme to generate modulation symbols, and rearranging higher-priority coding symbols into higher-reliability positions among positions of coding symbols in each modulation symbol. Positions of the symbols are determined by reliabilities of at least three classes according to an average bit error rate BER(ave) of symbols generated with the cross modulation scheme and a bit error rate BER for positions in the modulation symbol during transmission of a symbol generated with the cross modulation scheme.

BRIEF DESCRIPTION OF THE DRAWINGS

The above and other aspects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the annexed drawings. The matters defined in the description such as a detailed construction and elements are provided to assist in a comprehensive understanding of exemplary embodiments of the invention. Accordingly, those of ordinary skill in the art will recognize that various changes and modifications of the embodiment described herein can be made without departing from the scope and spirit of the invention. Additionally, the terms used herein are defined based on functions in the present invention and may vary according to users, operators' intention, or usual practices. Therefore, the definition of the terms should be made based on contents throughout the specification.

The present invention provides a method and apparatus for determining bit reliability of a symbol to apply a cross M-QAM modulation scheme, and allocating data corresponding to a reliability of the symbol bit according to the determined bit reliability during symbol mapping of a burst.

Before a description of the method for determining bit reliability of a cross M-QAM symbol is given, cross M-QAM in the GERAN Evolution system will be described in detail.

In cross M-QAM ($M=2^{m+1}$, $m=2, 3, \ldots$), $2^{m+1}$ bits, i.e., an even number of information, are transmitted on an In-phase channel (I-channel) and Quadrature channel (Q-channel) in one symbol on a distributed basis. Therefore, bits allocated to a constellation can be expressed as $i_1 i_2 \ldots i_{m+1}/q_1 q_1 \ldots q_{m+1}$, and i and q components are transmitted over the I-channel and the Q-channel, respectively. Due to the constellation characteristic, perfect Gray encoding is impossible for cross M-QAM. A level of Gray encoding can be calculated by introducing the concept of Gray penalty $G_p$. $G_p$ is defined as the average number of unequal bits between two adjacent symbols on the constellation and can be expressed as shown below in Equation (1).

$G_p=1$ in case of perfect Gray encoding $$G_p=(1+1/\sqrt{2M}+1/3M)>1 \text{ in case of pseudo-Gray encoding when } M\geq32 \qquad (1)$$

As shown in Equation (1), when $G_p=1$, perfect Gray encoding is performed, and when $G_p>1$, pseudo-Gray encoding is performed.

For cross M-QAM ($M=2^{m+1}$, $m=2, 3, \ldots$), since $G_p>1$, pseudo-Gray encoding is applied. When such pseudo-Gray encoding is applied, bits are allocated to each symbol so that a value of $G_p$ is minimized, i.e., approaches 1 ($G_p\approx1$). For example, a general modulation scheme can allocate bits $i_1 i_2 \ldots i_{m+1}/q_1 q_1 \ldots q_{m+1}$ for each symbol on a constellation. Shown in FIG. 3 is an example of a signal constellation for allowing the pseudo-Gray encoding scheme to be used in the 32-QAM modulation scheme to achieve $G_p\approx1$.

Figure 3:
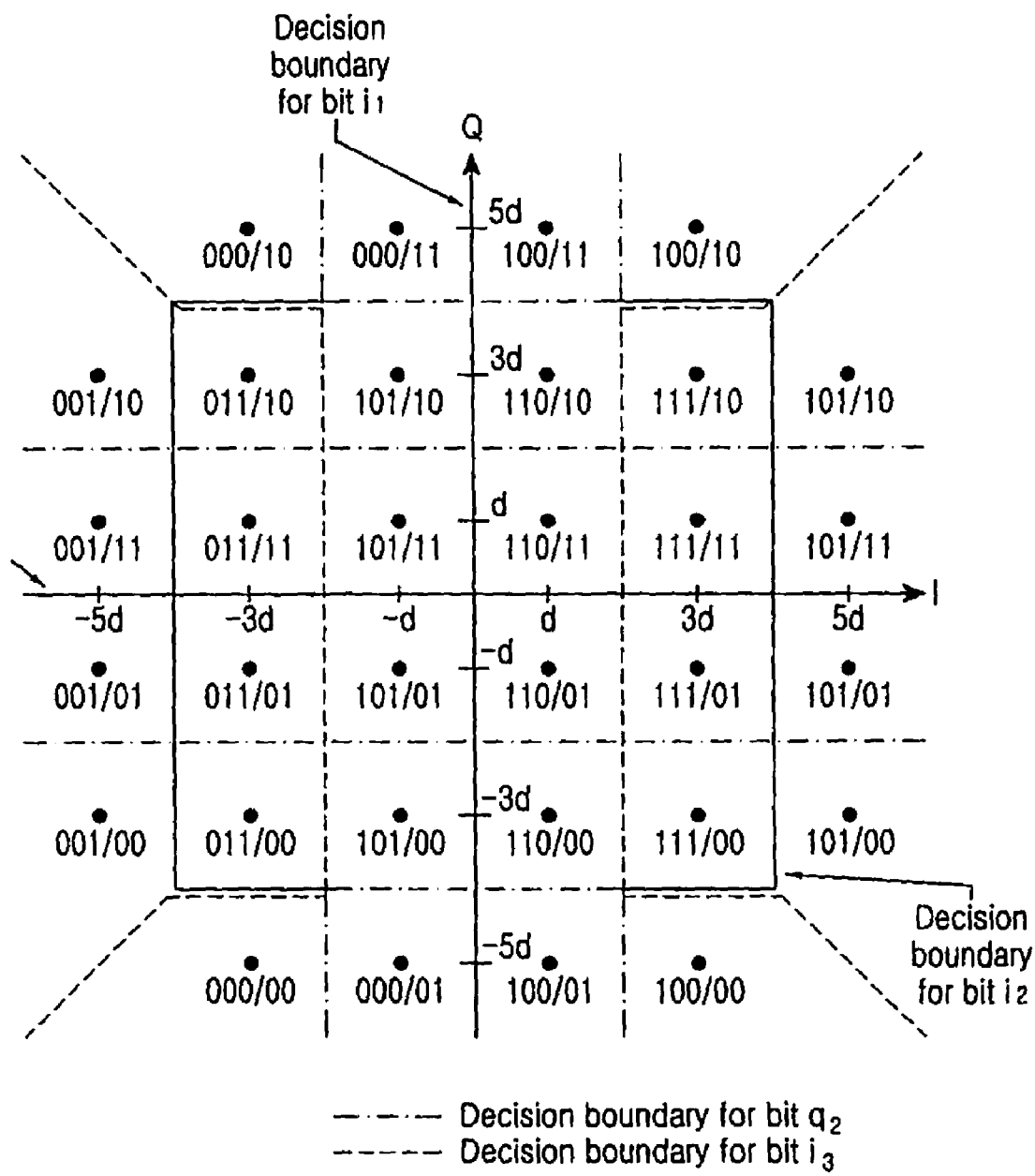
FIG. 3 is a diagram illustrating an example of a Gray-encoded signal constellation available in a 32-QAM modulation scheme.

Referring to FIG. 3, $G_p$ of 32-QAM is ⅞. A BER value for each bit position is distributed in various ways because of the pseudo-Gray encoding characteristic of the cross M-QAM constellation and because of the use of a decision boundary illustrated in FIG. 3 when the receiver performs symbol demodulation. For example, for cross 32-QAM and 128-QAM, a Bit Error Rate value for each bit position of a symbol has the following characteristics.

32-QAM: $BER(i_1)=BER(q_1)<BER(i_3)<BER(i_2)<BER(q_2)$

128-QAM: $BER(i_1)=BER(q_1)<BER(i_3)<BER(i_2)<BER(q_2)<BER(i_4)=BER(q_3)$

Generally, for high-order cross M-QAM with M≧128, the BER value shows the following symmetric pattern.

$BER(i_4)=BER(q_3), BER(i_5)<BER(q_4), \ldots, BER(i_{m+1})=BER(q_m)$

That is, the characteristic that every bit position of a symbol has a different BER value is a criterion for determining a reliability of each bit position, and the bit positions can be divided into Higher-Reliability Bit Positions (HBP), Medium-Reliability Bit Positions (MBP), and Lower-Reliability Bit Positions (LBP) using an average BER value BER (ave), as follows.

Assign a bit position HBP, if BER(ave)>BER value of each bit
Assign a bit position MBP, if BER(ave)≈BER value of each bit
Assign a bit position LBP, if BER(ave)<BER value of each bit For example, for 32-QAM, since an average BER value is $BER(ave) \approx BER(i_3)$, the bit positions can be divided in the following reliability levels.

HBP: $BER(i_1)$, $BER(q_1)$
MBP: $BER(i_3)$
LBP: $BER(i_2)$, $BER(q_2)$

For 128-QAM, since $BER(ave) \approx BER(i_3) \approx BER(i_2)$, the bit positions can be divided in the following reliability levels.

HBP: $BER(i_1)$, $BER(q_1)$
MBP: $BER(i_2)$, $BER(i_3)$
LBP: $BER(i_4)$, $BER(q_2) BER(q_3)$

Figure 4:
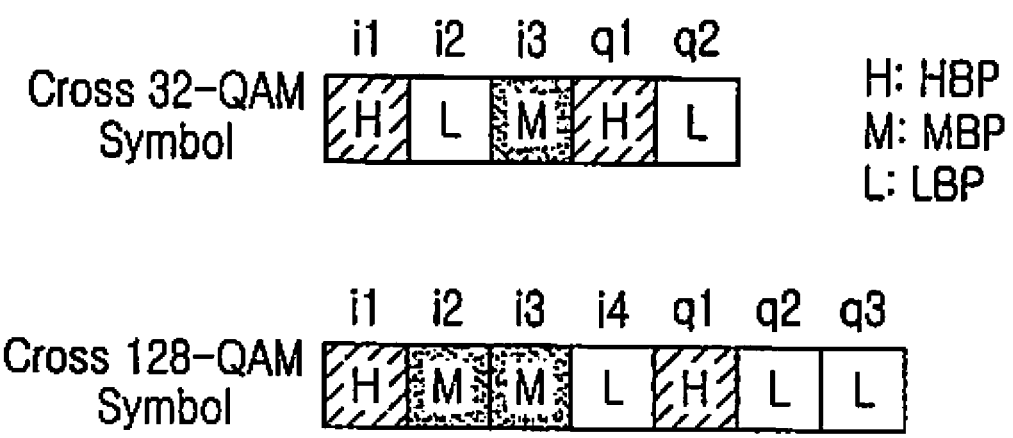
FIG. 4 is a diagram illustrating a structure of bits in a symbol according to a cross 32/128-QAM symbol mapping principle based on BER performance according to an embodiment of the present invention.

FIG. 4 is a bit mapping pattern based on the foregoing principle for 32-QAM and 128-QAM symbols according to the present invention. Referring to FIG. 4, a 32-QAM symbol is composed of 5 bits, and according to the foregoing principle, first and fourth bits can be disposed in HBP positions; a third bit can be disposed in a MBP position; and second and fifth bits are disposed in LBP positions.

A 128-QAM symbol is composed of 7 bits, and according to the foregoing principle, the first and fifth bits can be disposed in HBP positions; the second and third bits can be disposed in MBP positions; and the fourth, sixth and seventh bit can be disposed in LBP positions.

Figure 1:
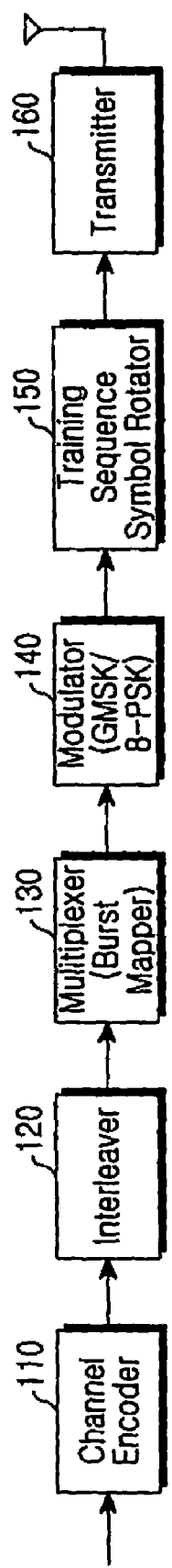
FIG. 1 is a block diagram illustrating a structure of a transmitter in the GERAN system.
Figure 2:
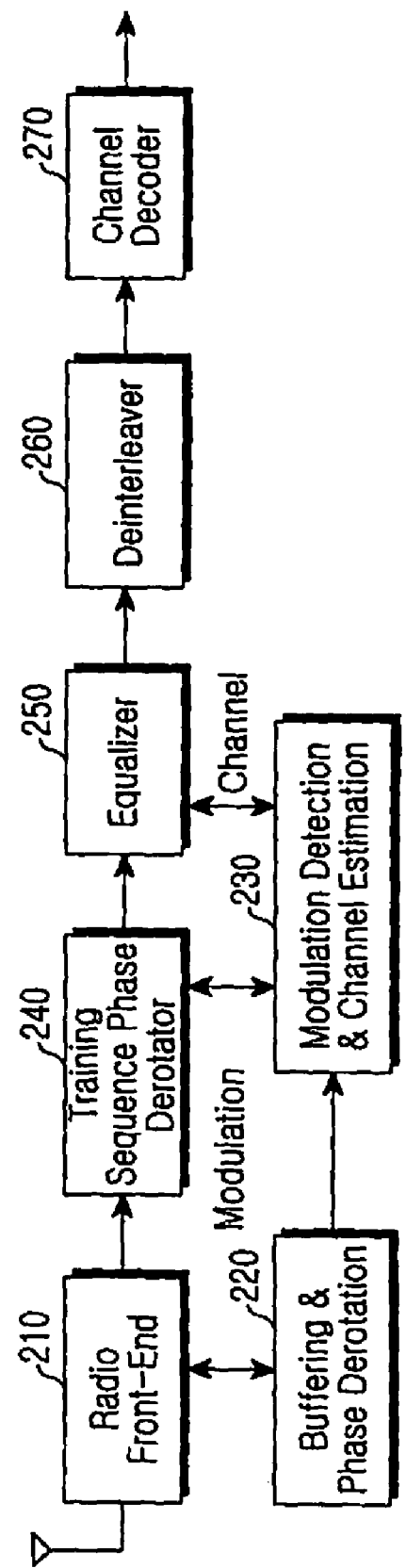
FIG. 2 is a block diagram illustrating a structure of a receiver in a GERAN system.

The reliability decision based on the BER value for the foregoing symbol bit pattern can be applied for performance improvement of the wireless communication system. That is, the reliability decision can be applied to the GERAN Evolution system newly adopting cross 32-QAM, and in realizing the proposed GERAN Evolution system, it is possible to perform symbol mapping using the foregoing symbol mapping principle in a channel encoding part and a multiplexing/burst mapping part for the downlink transmitter illustrated in FIG. 1.

Figure 5:
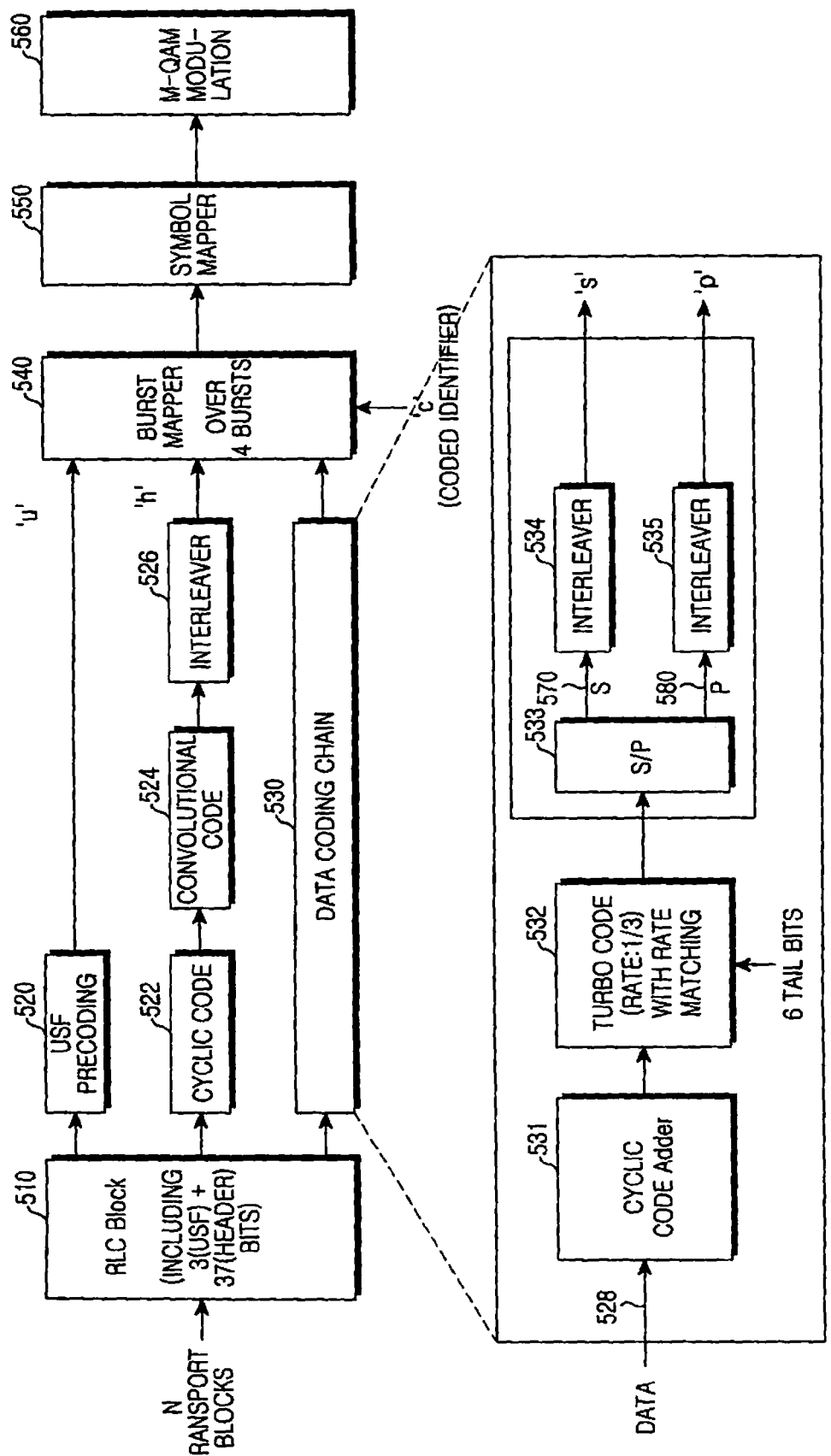
FIG. 5 is a block diagram illustrating a structure of a transmitter for burst mapping according to an embodiment of the present invention.

FIG. 5 is a block diagram illustrating a partial structure of a transmitter according to an embodiment of the present invention. Referring to FIG. 5, an RLC packet data block (RLC block) 510 is a user data message transmitted from a server over an Internet Protocol (IP) network. The user data message includes several data. More specifically, the user data message includes Uplink State Flag (hereinafter referred to as 'USF' or 'u') bits, header (hereinafter referred to as 'h') bits, and the user data. These data bits are input to their associated processing blocks. That is, the USF bits are input to a USF precoding block 520, the header bits are input to a cyclic code adder 522, and the user data is input to a data coding chain (or data coding unit) 530. In the following description, the USF and header are collectively referred to as control information. Coded identifier bits (hereinafter referred to as 'c') used for MCS identification are input to a burst mapper 540 without undergoing coding.

The USF being input to the USF precoding block 520 is input to the burst mapper 540, after parity bits are added thereto through precoding. The header being input to the cyclic code adder 522 is input to a convolutional encoder 524 after a Cyclic Redundancy Code (CRC) is added thereto. The convolutional encoder 524 performs convolutional coding on the input header, and outputs the coded header to an interleaver 526. The interleaver 526 performs interleaving on the coded header provided from the convolutional encoder 524, and outputs the result to the burst mapper 540.

Data 528 is input to a turbo encoder 532 after a CRC added thereto by an error detection algorithm in a cyclic code adder 531. The turbo encoder 532 outputs coded data obtained by performing code puncturing and rate matching on the CRC-added bits using a turbo code. A Serial-to-Parallel (S/P) converter 533 performs S/P conversion on the input coded data, separates the resulting data into systematic bits (hereinafter referred to as 'S') 570 and parity bits (hereinafter referred to as 'P') 580, and outputs them to interleavers 534 and 535, respectively. The first interleaver 534 for interleaving systematic bits performs interleaving on the input systematic bits, and the second interleaver 535 for interleaving parity bits performs interleaving on the input parity bits. The first interleaver 534 and the second interleaver 535 generate their associated bit streams, i.e., S stream and P stream, and output them to the burst mapper 540.

The burst mapper 540 gathers the coded identifier bits, USF, header, and the S and P stream coded bits received from the USF precoding block 520, interleaver 526, and interleavers 534 and 535 included in the data coding chain 530, respectively, and performs burst mapping thereon. Thereafter, the burst mapper 540 allocates the coded identifier bits, USF, header, and the S and P stream coded bits received to 4 bursts. An operation of the burst mapper 540 will be described in more detail with reference to FIG. 6.

Figure 6:
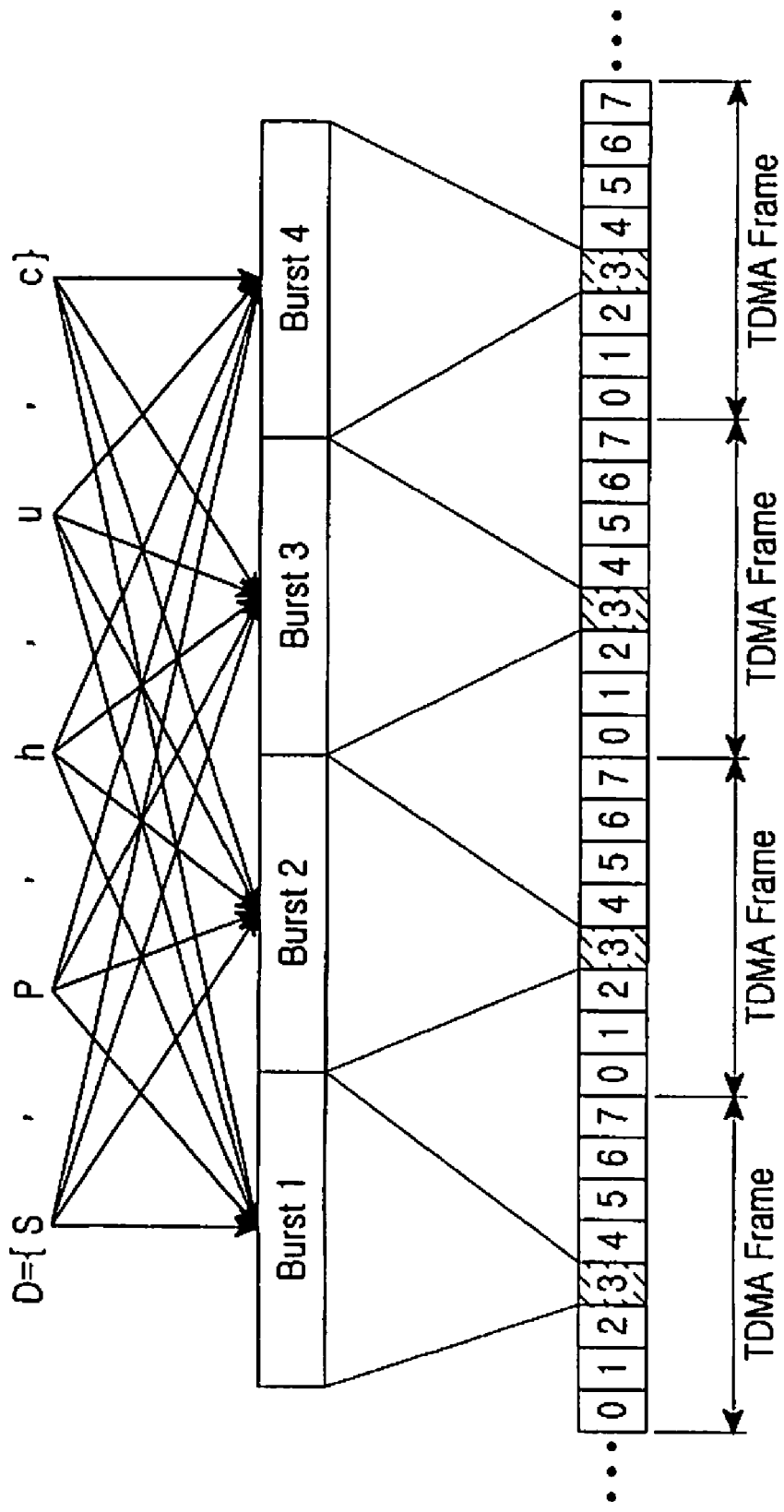
FIG. 6 is a diagram illustrating a burst mapping structure according to an embodiment of the present invention.

In FIG. 6, D={S, P, h, u, c} is data gathered as a single bit stream in the burst mapper 540. The burst mapper 540 uniformly partitions such data into 4 normal burst blocks.

In the GERAN system, each radio channel is composed of 8 time slots #0 to #7 as illustrated in FIG. 6, and the 8 time slots can support 8 different data streams, i.e., communication services for 8 users. The burst mapper 540 allocates each burst to time slots selected in 4 consecutive TDMA frames. FIG. 6 illustrates an example in which bursts are allocated to $4^{th}$ time slots in the 4 consecutive TDMA frames.

A detailed description will now be made of a scheme for partitioning the data streams back into bursts. The data streams in the gathered data block D={S, P, h, u, c} are uniformly partitioned into 4 bursts as follows.

$$S = \left\{ \begin{array}{c} \frac{s_1, s_2, \ldots, s_i}{s_1}, \frac{s_{i+1}, s_{i+2}, \ldots, s_{2i}}{s_2}, \frac{s_{2i+1}, s_{2i+2}, \ldots, s_{3i}}{s_3}, \\ \frac{s_{3i+1}, s_{3i+2}, \ldots, s_{4i}}{s_4} \end{array} \right\}$$

-continued $$P = \left\{ \underbrace{p_1, p_2, \ldots, p_n}_{P_1}, \underbrace{p_{n+1}, p_{n+2}, \ldots, p_{2n}}_{P_2}, \underbrace{p_{2n+1}, p_{2n+2}, \ldots, p_{3n}}_{P_3}, \underbrace{p_{3n+1}, p_{3n+2}, \ldots, p_{4n}}_{P_4} \right\}$$

$$h = \left\{ \underbrace{h_1, h_2, \ldots, h_r}_{h_1}, \underbrace{h_{r+1}, h_{r+2}, \ldots, h_{2r}}_{h_2}, \underbrace{h_{2r+1}, h_{2r+2}, \ldots, h_{3r}}_{h_3}, \underbrace{h_{3r+1}, h_{3r+2}, \ldots, h_{4r}}_{h_4} \right\}$$

$$u = \left\{ \underbrace{u_1, u_2, \ldots, u_j}_{u_1}, \underbrace{u_{j+1}, u_{j+2}, \ldots, u_{2j}}_{u_2}, \underbrace{u_{2j+1}, u_{2j+2}, \ldots, u_{3j}}_{u_3}, \underbrace{u_{3j+1}, u_{3j+2}, \ldots, u_{4j}}_{u_4} \right\}$$

$$c = \left\{ \underbrace{c_1, c_2, \ldots, c_k}_{c_1}, \underbrace{c_{k+1}, c_{k+2}, \ldots, c_{2k}}_{c_2}, \underbrace{c_{2k+1}, c_{2k+2}, \ldots, c_{3k}}_{c_3}, \underbrace{c_{3k+1}, c_{3k+2}, \ldots, c_{4k}}_{c_4} \right\}$$

Therefore, a data block $D_i$ partitioned in an $i^{th}$ burst among the 4 bursts can be expressed as shown below in Equation (2).

$$D_i = \{S_i, P_i, h_i, u_i, c_i\}, i=1, 2, 3, 4 \quad (2)$$

Data blocks $D_i$ each are partitioned again into 2 sub-blocks. The sub-blocks each have 58 symbols, and are allocated in both sides of a 26-symbol TSC as shown in FIG. 7.

Figure 7:
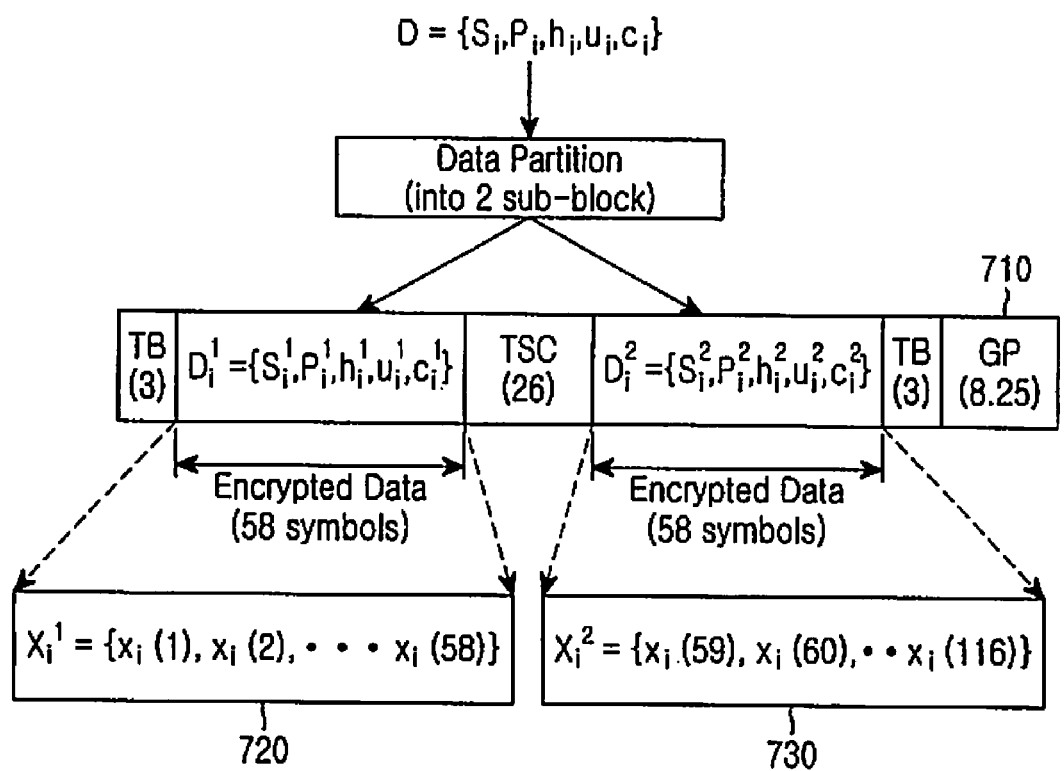
FIG. 7 is a diagram illustrating a symbol mapping structure on a normal burst according to an embodiment of the present invention.

FIG. 7 illustrates a structure of data disposed in one burst according to an embodiment of the present invention. In addition to the data parts D1 and D2 and the TSC part, the burst includes 3-symbol tail bits disposed in the left and right sides of the data parts D1 and D2, respectively, and an 8.25-symbol Guard Period (GP) located in the end of the burst.

The burst mapper 540 outputs bits allocated to 4 bursts to a symbol mapper 550. The symbol mapper 550 rearranges the bits allocated to each burst according to an arrangement pattern based on reliabilities of modulation symbols in the cross M-QAM scheme to be used.

Sub-blocks $D_i^1$ and $D_i^2$ of the data allocated to an $i^{th}$ burst are mapped to cross M-QAM symbol sub-blocks $x_i^1$ and $x_i^2$, respectively. The sub-blocks $x_i^1$ and $x_i^2$ mapped in the symbol form each include 58 symbols, as follows.

$$x_i^1 = \{x_i(1), x_i(2), \ldots, x_i(58)\}$$

$$x_i^2 = \{x_i(59), x_i(60), \ldots, x_i(116)\}$$

In the foregoing, $x_i(j)$ (where i=1, 2, 3, 4 and j=1, 2, ..., 116) denotes cross M-QAM symbols. When data blocks $D_i$ are mapped to symbol blocks $x_i$ to improve performance and reliability of the GERAN Evolution system using cross M-QAM symbols, it is possible to apply the symbol mapping principle based on the BER characteristic as described above. When a block $D_i$ of data bits allocated to an $i^{th}$ burst is bit-partitioned into sub-blocks $D_i^1$ and $D_i^2$ as illustrated in FIG. 7, there is a possibility that some of subsets $S_i$, $P_i$, $h_i$, $u_i$, $c_i$ have an odd number of bits. In this case, there is a need for appropriate bit partition. If elements of all subsets are assumed to have an even number of bits, the bits allocate to the first burst are as follows.

$$D_1^1 = \left\{ \underbrace{s_1, s_2, \ldots, s_{(i/2)}}_{s_1^1}, \underbrace{p_1, p_2, \ldots, p_{(n/2)}}_{p_1^1}, \underbrace{h_1, h_2, \ldots, h_{(r/2)}}_{h_1^1}, \underbrace{u_1, u_2, \ldots, u_{(j/2)}}_{u_1^1}, \underbrace{c_1, c_2, \ldots, c_{(k/2)}}_{c_1^1} \right\}$$

$$D_1^2 = \left\{ \underbrace{s_{(i/2)+1}, s_{(i/2)+2}, \ldots, s_i}_{s_1^2}, \underbrace{p_{(n/2)+1}, p_{(n/2)+2}, \ldots, p_n}_{p_1^2}, \underbrace{h_{(r/2)+1}, h_{(r/2)+2}, \ldots, h_r}_{h_1^2}, \underbrace{u_{(j/2)+1}, u_{(j/2)+2}, \ldots, u_j}_{u_1^2}, \underbrace{c_{(k/2)+1}, c_{(k/2)+2}, \ldots, c_k}_{c_1^2} \right\}$$

Also, the remaining bursts are uniformly partitioned in the same manner. When the symbol mapping technology based on a BER value for cross M-QAM is applied, it is possible to perform symbol mapping after first defining priority (or importance) of data in the following two methods.

First Method

The first method classifies the non-channel-coded bit $c_i$ in the data as the highest-priority data, and classifies a bit $P_i$ in the encoded RLC block data as the lowest-priority data, thereby defining priorities of data as follows.

highest-priority data: $c_i$
second-highest-priority data: $h_i$, $u_i$
third-highest-priority data: $S_i$
lowest-priority data: $P_i$ The data allocated to a first burst according to the priority can be arranged in the following bit order.

$$D_1^1 = \begin{bmatrix} \underbrace{c_1, c_2, \ldots, c_{(k/2)}}_{c_1^1}, \underbrace{h_1, h_2, \ldots, h_{(r/2)}}_{h_1^1} \\ \underbrace{u_1, u_2, \ldots, u_{(j/2)}}_{u_1^1}, \underbrace{s_1, s_2, \ldots, s_{(i/2)}}_{s_1^1}, \underbrace{p_1, p_2, \ldots, p_{(n/2)}}_{p_1^1} \end{bmatrix}$$

$$D_1^2 = \begin{bmatrix} \underbrace{c_{(k/2)+1}, c_{(k/2)+2}, \ldots, c_k}_{c_1^2}, \underbrace{h_{(r/2)+1}, h_{(r/2)+2}, \ldots, h_r}_{h_1^2} \\ \underbrace{u_{(j/2)+1}, u_{(j/2)+2}, \ldots, u_j}_{u_1^2}, \underbrace{s_{(i/2)+1}, s_{(i/2)+2}, \ldots, s_i}_{s_1^2} \\ \underbrace{p_{(n/2)+1}, p_{(n/2)+2}, \ldots, p_n}_{p_1^2} \end{bmatrix}$$

The remaining 3 bursts can also be arranged in the same manner.

Second Method

The second method classifies the coded identifier bit, RLC/MAC header information and USF information as the highest-priority data; RLC data $S_i$ as the second-highest-priority data; and $P_i$ as the lowest-priority data.

highest-priority data: $c_i$, $h_i$, $u_i$
second highest-priority data: $S_i$
lowest-priority data: $P_i$ First data is arranged according to the priority in the bit order defined in the first method.

$$D_1^1 = \begin{bmatrix} \underbrace{c_1, c_2, \ldots, c_{(k/2)}}_{c_1^1}, \underbrace{h_1, h_2, \ldots, h_{(r/2)}}_{h_1^1} \\ \underbrace{u_1, u_2, \ldots, u_{(j/2)}}_{u_1^1}, \underbrace{s_1, s_2, \ldots, s_{(i/2)}}_{s_1^1}, \underbrace{p_1, p_2, \ldots, p_{(n/2)}}_{p_1^1} \end{bmatrix}$$

$$D_1^2 = \begin{bmatrix} \frac{c_{(k/2)+1}, c_{(k/2)+2}, \ldots, c_k, h_{(r/2)+1}, h_{(r/2)+2}, \ldots, h_r,}{c_1^2} & \frac{h_{(r/2)+1}, h_{(r/2)+2}, \ldots, h_r,}{h_1^2} \\ \frac{u_{(j/2)+1}, u_{(j/2)+2}, \ldots, u_j, s_{(i/2)+1}, s_{(i/2)+2}, \ldots, s_i,}{u_1^2} & \frac{s_{(i/2)+1}, s_{(i/2)+2}, \ldots, s_i,}{s_1^2} \\ \frac{p_{(n/2)+1}, p_{(n/2)+2}, \ldots, p_n}{p_1^2} & \end{bmatrix}$$

However, since $c_i$, $h_i$ and $u_i$; have the same priority, not only the arrangement of $[c_i, h_i, u_i, \ldots]$ but also other arrangements are possible. That is, arrangements $[c_i, u_i, h_i, \ldots]$, $[h_i, c_i, u_i, \ldots]$, $[h_i, u_i, c_i, \ldots]$, $[u_i, c_i, h_i, \ldots]$ and $[u_i, h_i, c_i, \ldots]$ are possible. The remaining 3 bursts can also be arranged in the same manner.

Referring back to FIG. 5, the symbol mapper 550 performs the symbol mapping on each burst, and then outputs the symbol-mapped bursts to a cross M-QAM modulator 560. A detailed description of the symbol mapping method will be given later for the different embodiments. Although the symbol mapper 550 is provided herein as a separate element for more convenient illustrative purposes, it can be realized in the burst mapper 540.

The cross M-QAM modulator 560 performs cross M-QAM modulation on the modulation symbols based on a predetermined signal constellation. Each of the modulation symbols has an odd number of bits of the bursts received from the symbol mapper 550. For ease of description, a detailed description of an apparatus additionally needed to transmit the modulated signal, for example, Digital-to-Analog (D/A) converter, will be omitted herein.

Figure 8:
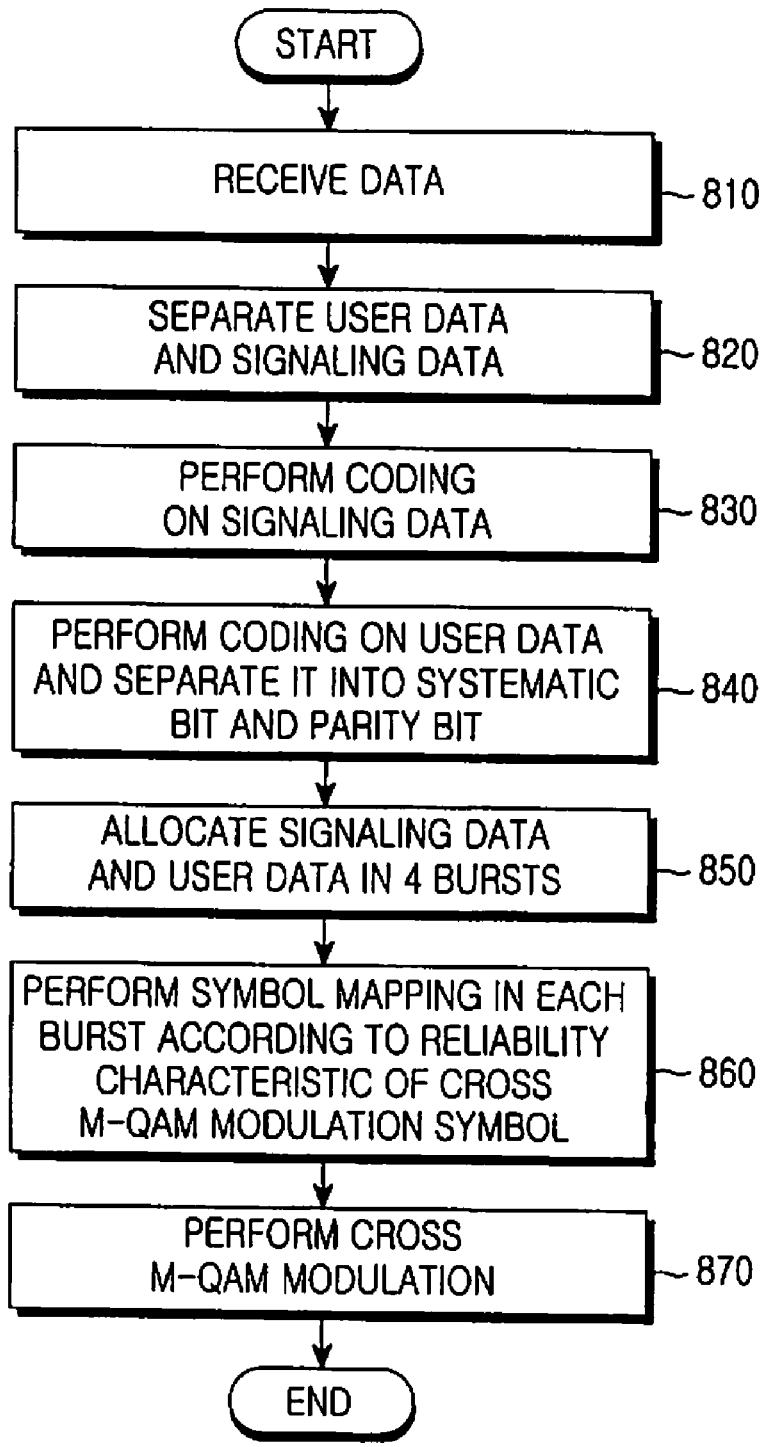
FIG. 8 is a flowchart illustrating a cross M-QAM burst mapping method according to an embodiment of the present invention.

With reference to FIG. 8, a description will now be made of a burst mapping process in a transmitter of the foregoing system according to an embodiment of the present invention.

Referring to FIG. 8, in step 810, an RLC block 510 of FIG. 5 receives data. In step 820, the RLC block 510 separates the received data into signaling data and user data. The signaling data includes coded identifier bit, USF, and header. In step 830, the signaling data undergoes a coding process. That is, in the signaling data, a USF precoding block 520 precodes the USF, and the header undergoes a convolutional coding process in a convolutional encoder 524 after a CRC code is added thereto in a cyclic code adder 522, and then is interleaved by an interleaver 526. Preferably, the USF precoding process and the header coding process are performed in parallel.

In step 840, the user data undergoes a coding process. More specifically, the user data is input to a cyclic code adder 531, and the cyclic code adder 531 adds a CRC code to the input user data, and transfers the CRC-added user data to a turbo encoder 532. The turbo encoder 532 performs code puncturing and rate matching on the provided data, and outputs the resulting data to an S/P converter 533. The S/P converter 533 separates the input data into systematic bits and parity bits, and transfers them to their associated interleavers 534 and 535, respectively. The interleavers 534 and 535 perform interleaving on the input systematic bits and parity bits, respectively. In this way, the user data undergoes coding in step 840. Preferably, steps 830 and 840 are performed in parallel.

In step 850, a burst mapper 540 uniformly disposes the coded identifier bit (c), USF (u), header (h) and user data (s, p) in 4 bursts. In step 860, a symbol mapper 550 performs symbol mapping on the bits arranged in each burst in step 850, according to the reliability characteristic of modulation symbols based on an M-QAM signal constellation. Preferably, such symbol mapping is achieved with the various embodiments, which will be described below.

In each modulation symbol, an arrangement of the higher-reliability bit position (H), the medium-reliability bit position (M), and the lower-reliability bit position (L) can be HLMHL for 32-QAM and HMMLHLL for 128-QAM according to the M-QAM modulation scheme used. When the symbol mapping technology based on the BER value for cross M-QAM is applied, it is possible to perform symbol mapping after defining priorities of data with one of the above two methods. In step 870, a cross M-QAM modulator 560 performs cross M-QAM modulation on bits of the data that underwent symbol mapping in step 860.

Next, a description of step 860 of allocating data to symbols using the above-defined data priority classification will be given using various embodiments. Each embodiment shows exemplary symbol allocation for a first burst among the four bursts. The same symbol allocation can be applied even to the remaining three bursts.

An operation of mapping symbols as follows using the foregoing data priority-based bit arrangement follows the rule specified in the following embodiments. In FIGS. 9 to 13, $x_1(j)$ (where j=1, 2, . . . , 116) represents one 5-bit or 7-bit M-QAM symbol.

First Allocation Embodiment

Figure 9:
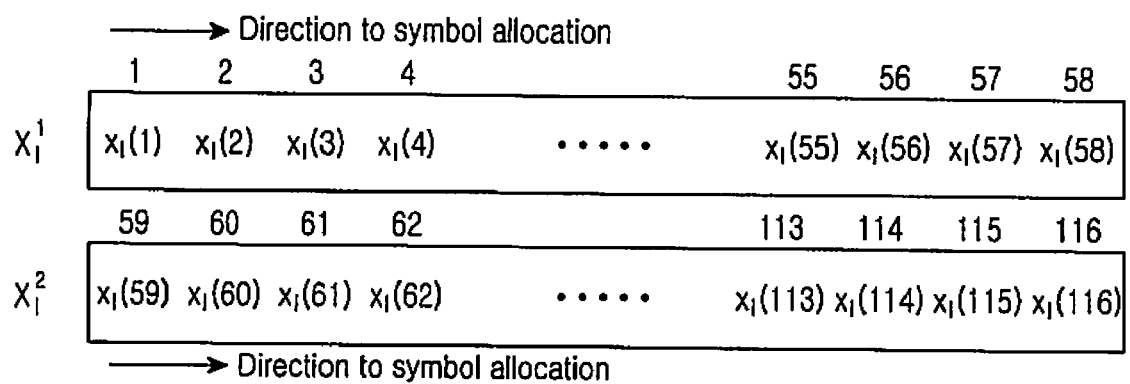
FIG. 9 is a diagram illustrating a cross M-QAM burst mapping method according to an embodiment of the present invention.

1. Regarding symbol allocation order, symbols are sequentially arranged beginning from $x_1(1)$ up to $x_1(116)$ as illustrated in FIG. 9.

2. For each symbol, bits are allocated according to the data priority, in the order specified in one of the above-defined two methods.

3. Bits are allocated to bit positions of each symbol in order of HBP->MBP->LBP as illustrated in FIG. 10.

Figure 10:
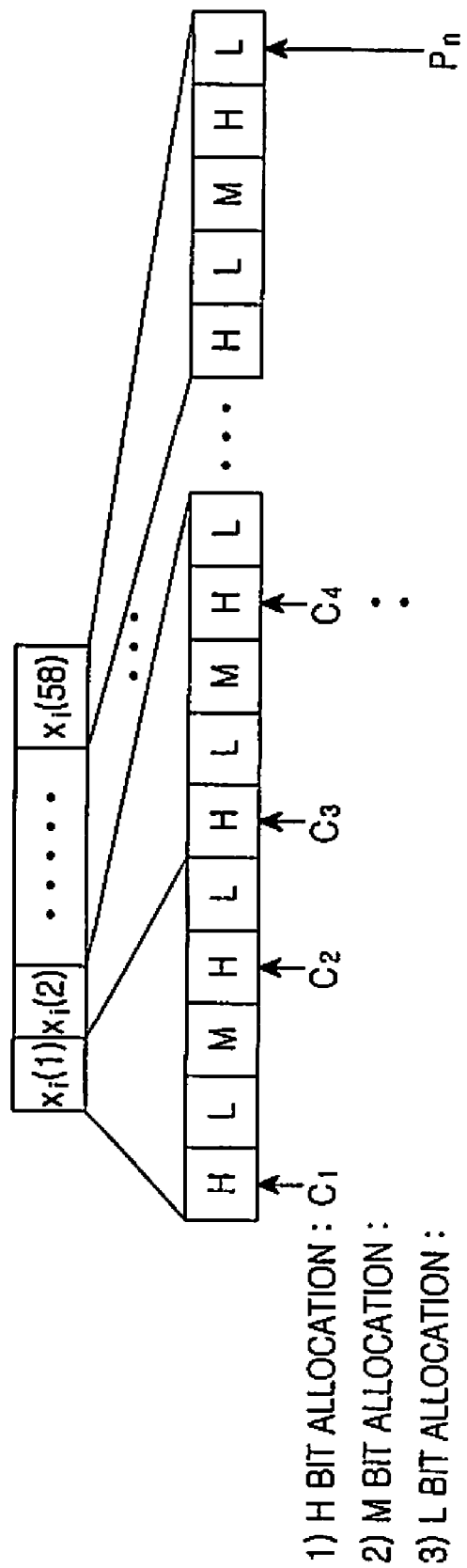
FIG. 10 is a diagram illustrating the symbol bit allocation method of FIG. 9.

FIG. 10 is a diagram illustrating the bits allocated to bit positions of each symbol. In FIG. 10, for cross 32-QAM, five bit positions are 'H L M H L', and a first data block undergoes symbol mapping using the data priority arrangement defined in the First Method. Referring to FIG. 10, two bits $c_1$ and $c_2$ are allocated to "H" bit positions of a first symbol $x_1(1)$, and bits $C_3$ and $c_4$ are allocated to "H" bit positions of a second symbol $x_1(2)$. After all "H" bit positions are allocated for up to the last symbol $x_1(58)$ in the first sub-block in this order, the succeeding bits are allocated to an "M" bit position of the first symbol $x_1(1)$. After "M" bit positions of each symbol are all allocated, the remaining bits can be allocated beginning from an "L" bit position of the first symbol $x_1(1)$. Even when the data priority arrangement defined in the Second Method is used, the bits can be allocated in the same manner.

4. Regarding symbol mapping for the first sub-block, bits are allocated in the same method as that described in 3.

Second Allocation Embodiment

Figure 11:
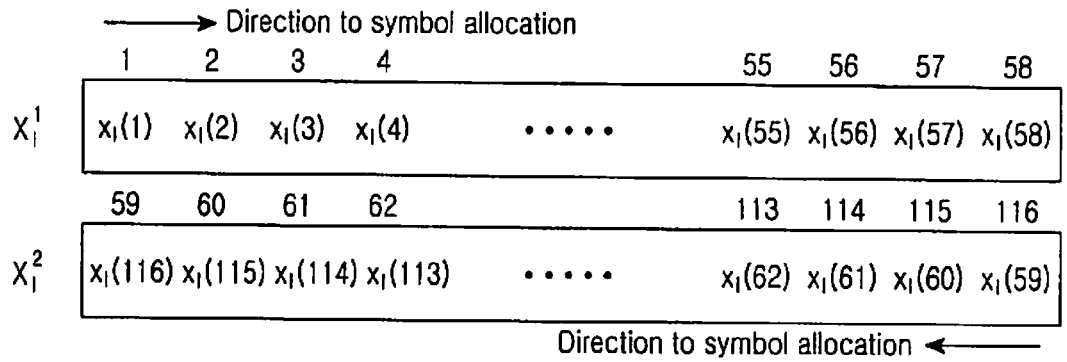
FIG. 11 is a diagram illustrating a cross M-QAM burst mapping method according to an embodiment of the present invention.

1. Regarding symbol allocation order, as illustrated in FIG. 11, for a first sub-block, symbols are sequentially arranged beginning from a symbol $x_1(1)$ up to $x_1(58)$, and for a second sub-block, symbols are arranged in the reverse direction beginning from an $118^{th}$ symbol position at $x_1(59)$ up to a symbol $x_1(116)$.

2. Since a mapping method for each symbol is equal to the method described in the first allocation embodiment, a detailed description thereof will be omitted herein.

Third Allocation Embodiment

Figure 12:
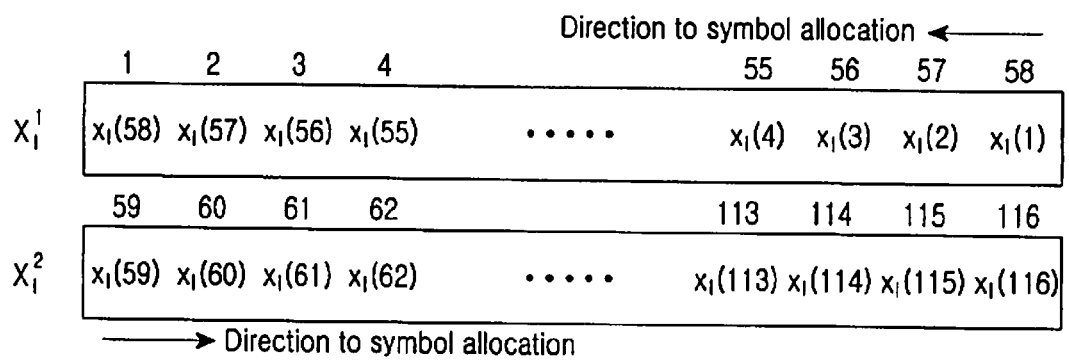
FIG. 12 is a diagram illustrating a cross M-QAM burst mapping method according to an embodiment of the present invention.

1. Regarding symbol allocation order, as illustrated in FIG. 12, for a first sub-block, symbols are arranged in a reverse direction beginning from the $58^{th}$ symbol at $x_1(1)$ up to $x_1(58)$, and for a second sub-block, symbols are arranged in a forward direction beginning from a $59^{th}$ symbol position at a symbol $x_1(59)$ up to a symbol $x_1(116)$.

2. A mapping method for each symbol follows the method described in the first allocation embodiment.

Fourth Allocation Embodiment

Figure 13:
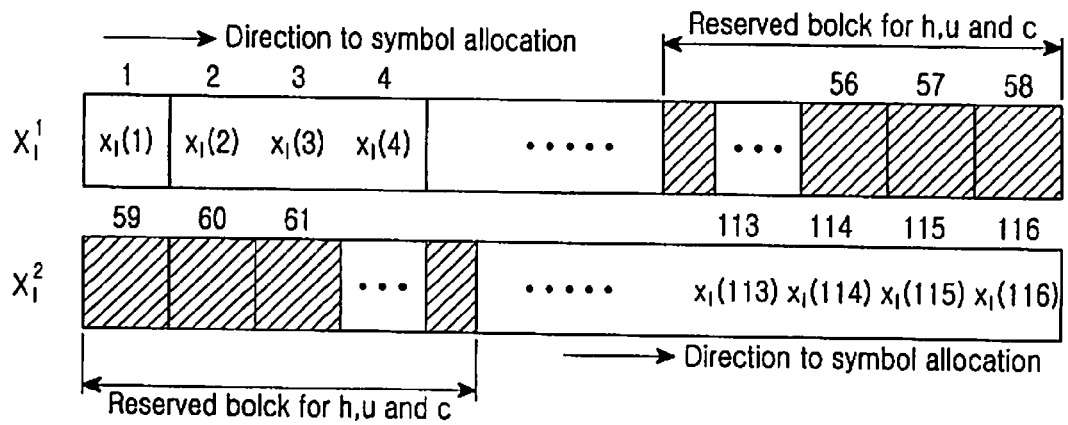
FIG. 13 is a diagram illustrating a cross M-QAM burst mapping method according to an embodiment of the present invention.

1. Regarding symbol allocation order, as illustrated in FIG. 13, a reserved block for arranging $c_1$, $h_1$ and $u_1$ beside TSC is defined, and bits corresponding to $c_1$, $h_1$ and $u_1$ are preferentially sequentially allocated regardless of bit priority of an M-QAM symbol.

2. For a first sub-block, bits are allocated to the remaining symbol positions after starting arranging a symbol $x_1(1)$ to a $1^{st}$ position. Even for a second sub-block, bits are allocated in the forward direction up to a symbol $x_1(116)$ in the same manner.

3. In the bit allocation of step 2, a mapping method for each symbol follows the method described in the first allocation embodiment.

4. In order to guarantee robustness against $c_1$, $h_1$ and $u_1$ consecutively allocated in a reserved block, it is possible to perform bit swapping with bit positions to which adjacent data, i.e., $S_i$ and $P_i$, are allocated.

Figure 14:
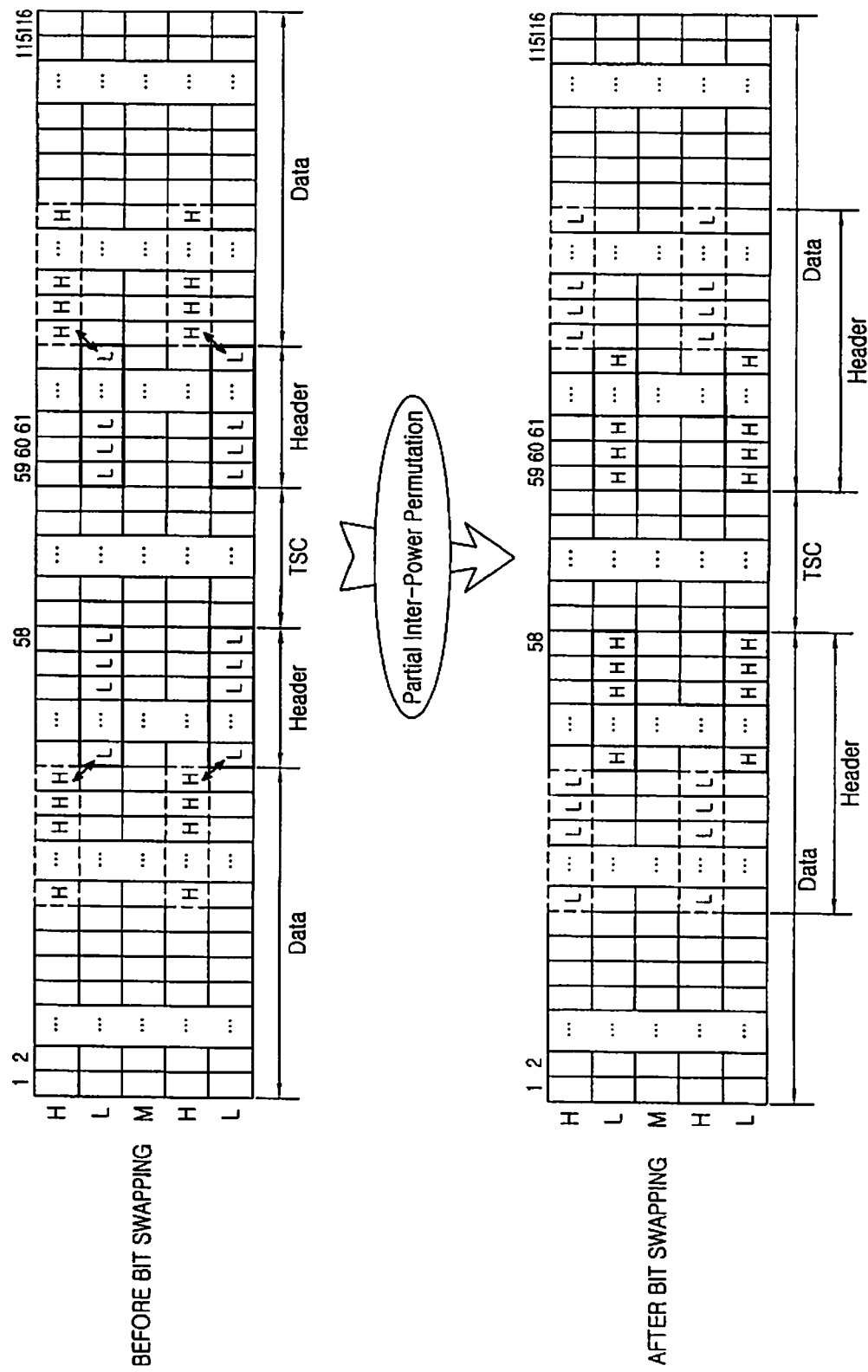
FIG. 14 is a diagram illustrating a bit swapping method in cross 32-QAM burst mapping according to an embodiment of the present invention.

When the symbol mapping technology based on the BER value for cross M-QAM is applied, as done in the fourth allocation embodiment, a header part composed of coded identifier bit, RLC/MAC header information and USF information is sequentially allocated to a reserved block allocated to a first sub-block and second sub-block regardless of bit priority of M-QAM symbol. As specified in step 4 of the fourth allocation embodiment, in order to prevent an error for the header part, i.e., $c_i$, $h_i$ and $u_i$, it is possible to perform bit swapping with adjacent data. In performing bit swapping, the header part bits allocated to the lower-reliability bit positions (L) undergo bit swapping with the bits allocated to the higher-reliability bit positions (H) or the medium-reliability bit positions (M) among the adjacent user data bits, making it possible to arrange all header part information in the higher-reliability bit positions (H). A description of bit swapping for 32-QAM and 128-QAM symbols will be given in the next allocation embodiment. That is, as illustrated in FIG. 14 (for 32-QAM) and FIG. 15 (for 128-QAM), each burst can be expressed in the matrix form. In the matrix, one column represents one symbol, and one row in one column represents one bit.

Fifth Allocation Embodiment

1. Header part information bits $c_i$, $h_i$ and $u_i$ are separated into two parts, and then arranged reserved blocks in a first sub-block and a second sub-block.

Figure 15:
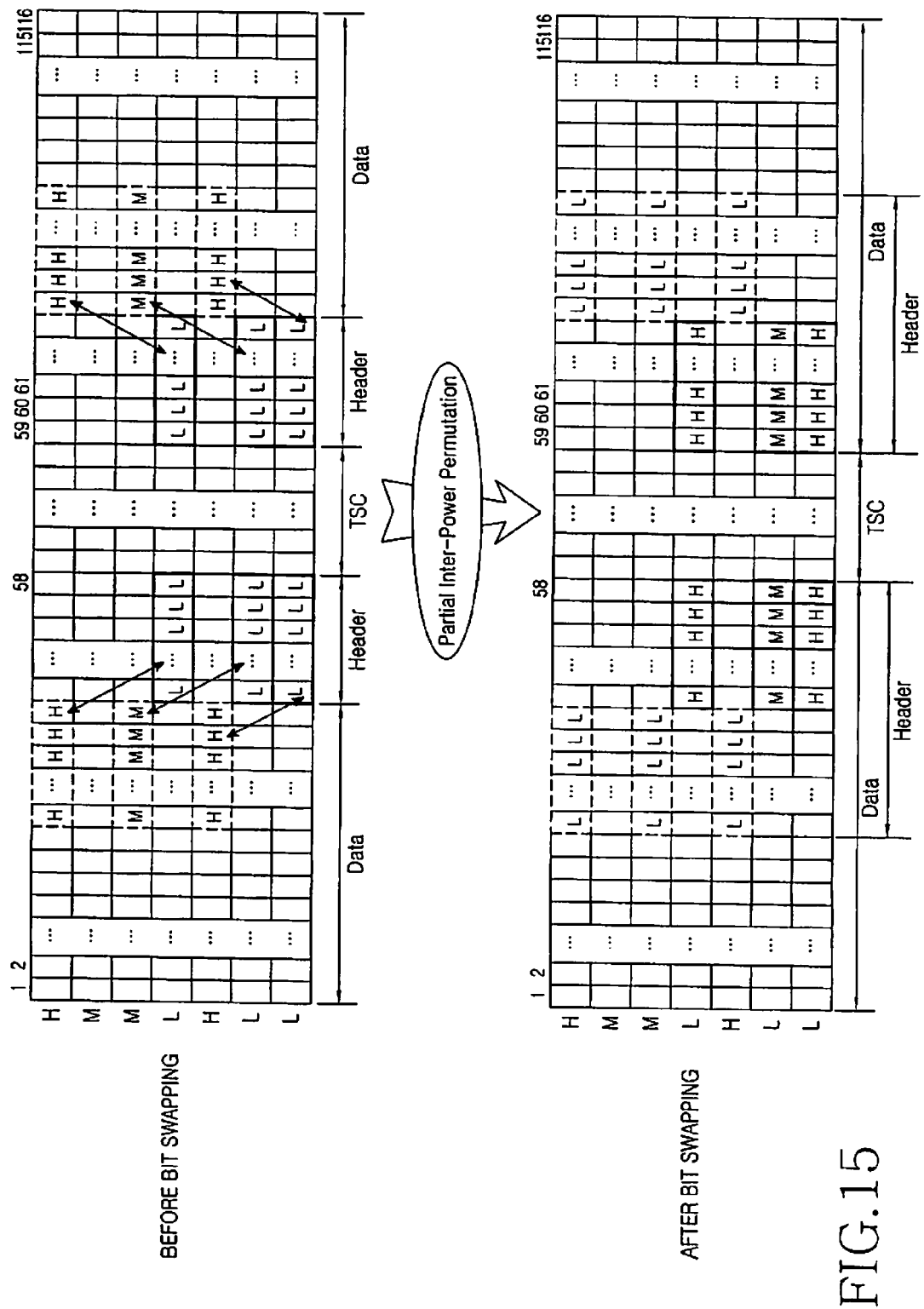
FIG. 15 is a diagram illustrating a bit swapping method in cross 128-QAM burst mapping according to an embodiment of the present invention.

2. User data bits scheduled to undergo bit swapping with the bits allocated to L bit positions among the header part bits in each sub-block are selected. As illustrated in FIGS. 14 and 15, user data scheduled to undergo bit swapping (hereinafter referred to as 'bit swapping-target user data') is data allocated to the higher-reliability bit positions among the user data bits most adjacent to the header part. For example, for 32-QAM, the user data allocated to first and fourth rows is swapping-target user data before bit swapping of FIG. 14, and for 128-QAM, a first row (H row) through a third row (M row), and a fifth row (H row) can be selected as swapping-target data before bit swapping of FIG. 15.

3. In performing bit swapping on the selected data, partial inter-row permutation is applied. For example, for 32-QAM, after bit swapping illustrated in FIG. 14 is performed, header part bits allocated to a second row undergo inter-row permutation with the adjacent first row data, and header part bits allocated to a fifth row undergo inter-row permutation with the adjacent fourth row data. For 128-QAM, as illustrated in FIG. 15, after bit swapping is performed, user data bits selected from a first row (H row), a third row (M row), and a fifth row (H row) undergo inter-row permutation with a fourth row, a sixth row, and a seventh row, respectively. Although not described in the embodiment illustrated in FIG. 15, alternatively, the user data in the second row (M row) instead of the third row (M row) can be used as a bit swapping target.

From the standpoint of the column, the partial inter-row permutation can be considered as partial inter-column permutation, since header part bits included in each column undergo permutation with the data part bits included in each column.

A description of all the foregoing allocation embodiments has been given for the normal bursts used in GSM/EDGE. However, it would be obvious to those skilled in the art that the same can be applied to 1.2-times higher symbol rate, such as that scheduled to be used in GERAN Evolution.

As is apparent from the foregoing description, the present invention designs efficient burst mapping for GERAN Evolution system by applying the symbol mapping technology to the cross M-QAM modulation technology, thereby contributing to an increase in performance and reliability without affecting the system complexity.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for determining a bit pattern of a symbol in a wireless communication system using a cross modulation scheme, the method comprising:
    generating symbols with the cross modulation scheme;
    classifying positions of coding symbols by reliabilities of at least 3 classes according to an average bit error rate BER(ave) of the symbols generated with the cross modulation scheme and a bit error rate BER based on transmission positions of the coding symbols in a modulation symbol during transmission of a packet with the cross modulation scheme; and
    determining a bit pattern such that higher-priority symbols are inserted into higher-reliability positions.

2. The method of claim 1, wherein the classifying comprises:
    determining, as medium-reliability positions, positions of symbols where a bit error rate based on a coding symbol position in the modulation symbol is equal to the average bit error rate $BER_{(ave)}$ of the modulation symbol or has a difference in a bit error rate within a predetermined scope from the average bit error rate ($BER_{(ave)}$ of the modulation symbol;
    determining, as higher-reliability positions, positions of symbols having a bit error rate lower than a scope of the medium reliability; and
    determining, as lower-reliability positions, positions of symbols having a bit error rate higher than the scope of the medium reliability.

3. The method of claim 1, wherein when the cross modulation scheme is 32-ary Quadrature Amplitude Modulation (QAM), the classifying comprises:
- determining first and fourth symbol positions in the modulation symbol as higher-reliability positions;
- determining a third symbol position as a medium-reliability position; and
- determining second and fifth symbol positions as lower-reliability positions.

4. The method of claim 1, wherein when the cross modulation scheme is 128-QAM, the classifying comprises:
- determining first and fifth symbol positions in the modulation symbol as higher-reliability positions;
- determining second and third symbol positions as medium-reliability positions; and
- determining fourth, sixth, and seventh symbol positions as lower-reliability positions.

5. An apparatus for determining a bit pattern of a symbol in a transmitter of a wireless communication system using a cross modulation scheme, the apparatus comprising:
- a mapper for partitioning coded user data and control information into data having a transmittable size within in a frame, partitioning data mapped to each frame in units of sub-blocks, and mapping the partitioned data; and
- a cross modulator for modulating the sub-block based data with the cross modulation scheme to generate modulation symbols, and rearranging higher-priority coding symbols in higher-reliability positions among positions of coding symbols in each of the modulation symbols;
- wherein positions of the symbols are determined by reliabilities of at least three classes according to an average bit error rate BER(ave) of symbols generated with the cross modulation scheme and a bit error rate BER for positions in the modulation symbol during transmission of a symbol generated with the cross modulation scheme.

6. The apparatus of claim 5, wherein the mapper comprises:
- a burst mapper for partitioning channel-coded user data, channel-coded control information, and non-channel-coded control information into a coding symbol with a size that is transmittable in the frame; and
- a symbol mapper for partitioning coding symbols mapped to each of the frames in units of sub-blocks, and mapping the partitioned symbols.

7. The apparatus of claim 5, wherein the cross modulator
- determines, as medium-reliability positions, positions of symbols where a bit error rate based on a coding symbol position in the modulation symbol is equal to the average bit error rate $BER_{(ave)}$ or has a difference in a bit error rate within a predetermined scope from the average bit error rate $(BER_{(ave)}$,
- determines, as higher-reliability positions, positions of symbols having a bit error rate lower than a scope of the medium reliability, and
- determines, as lower-reliability positions, positions of symbols having a bit error rate higher than the scope of the medium reliability.

8. The apparatus of claim 5, wherein when the cross modulation scheme is 32-ary Quadrature Amplitude Modulation (QAM), the cross modulator determines first and fourth symbol positions as higher-reliability positions, determines a third symbol position as a medium-reliability position, and determines second and fifth symbol positions as lower-reliability positions.

9. The apparatus of claim 5, wherein when the cross modulation scheme is 128-QAM, the cross modulator determines first and fifth symbol positions as higher-reliability positions, determines second and third symbol positions as medium-reliability positions, and determines fourth, sixth and seventh symbol positions as lower-reliability positions.

10. The apparatus of claim 5, wherein the control information includes a header, an uplink state flag, and a coded identifier bit that has not undergone channel coding.

11. The apparatus of claim 10, wherein the cross modulator sets a priority of the coded identifier bit to the highest priority, sets a priority of the header and the uplink state flag to the second highest priority, sets a priority of systematic symbols in the user data to the third highest priority, and sets a priority of parity symbols in the user data to a fourth highest priority.

12. The apparatus of claim 10, wherein the cross modulator sets a priority of the coded identifier bit, the header and the uplink state flag to the highest priority, sets priority of systematic symbols in the user data to the second highest priority, and sets priority of parity symbols in the user data to the third highest priority.

13. The apparatus of claim 5, wherein the cross modulator sequentially allocates modulation symbols to each sub-block of the frame.

14. The apparatus of claim 5, wherein the cross modulator sequentially allocates modulation symbols from a first position for a first sub-block of the frame, and allocates modulation symbols from a last position to a first position for a second sub-block.

15. The apparatus of claim 5, wherein the cross modulator allocates modulation symbols from a last position to a first position for a first sub-block of the frame, and sequentially allocates modulation symbols from a first position for a second sub-block.

16. The apparatus of claim 5, wherein the cross modulator previously sets and reserves positions where the control information is to be allocated among sub-blocks of the frame, sequentially allocates modulation symbols to each of the sub-blocks in remaining positions, and allocates the control information to the reserved positions.

17. The apparatus of claim 16, wherein when a modulation symbol in a position where control information is allocated is a lower-priority symbol in the sub-blocks, the cross modulator performs swapping with one of a higher- or medium-reliability position.

18. The apparatus of claim 17, wherein the position swapping includes swapping with adjacent symbols.

19. The apparatus of claim 17, wherein the position swapping includes a partial inter-row permutation.

* * * * *